United States Patent [19]
Lin et al.

[11] Patent Number: 5,812,285
[45] Date of Patent: Sep. 22, 1998

[54] FLATBED-TYPE SCANNER HAVING A COVER FOR AN ORIGINAL DOCUMENT WHICH CAN ADJUST HEIGHT AUTOMATICALLY

[75] Inventors: Tzi Chi Lin; Zi Ching Chang, both of Hsinchu, Taiwan

[73] Assignee: Microtek International Inc., Hsinchu, Taiwan

[21] Appl. No.: 722,801

[22] Filed: Sep. 27, 1996

[51] Int. Cl.⁶ .......................... H04N 1/04; G03G 15/08; G03G 15/00; G03B 27/32
[52] U.S. Cl. .......................... 358/497; 358/497; 399/262; 399/380; 355/75; 355/25
[58] Field of Search .......................... 358/497; 399/362, 399/380; 355/75, 25

[56] References Cited

U.S. PATENT DOCUMENTS

| | | | |
|---|---|---|---|
| Re. 30,878 | 3/1982 | Wakeman | 355/75 |
| 4,403,856 | 9/1983 | Torto et al. | 355/25 |

*Primary Examiner*—Edward L. Coles
*Assistant Examiner*—Twyler M. Lamb
*Attorney, Agent, or Firm*—Bacon & Thomas

[57] ABSTRACT

A cover for a flatbed-type scanner is provided with a pair of supporting arms for supporting horizontal axial bodies which are captured in recesses at edges of the main body of the scanner and permitted to move vertically in the recesses so as to permit vertical movement of the cover. The cross-sections of the axial bodies have a length which is greater than the width, and the recesses have openings defined by resilient members to have a width that is greater than the length of the cross-sections and less than the width of the cross-sections to enable the axial bodies to be inserted into the recesses upon rotation of the cover and to subsequently prevent unintentional removal of the axial bodies from the recesses as the cover is moved vertically to accommodate different thicknesses of documents while maintaining a substantially horizontal orientation.

3 Claims, 5 Drawing Sheets

FLATBED-TYPE SCANNER HAVING A COVER FOR AN ORIGINAL DOCUMENT WHICH CAN ADJUST HEIGHT AUTOMATICALLY

BACKGROUND OF THE INVENTION

1. Field of the Invention

This invention relates to a flatbed-type scanner having a cover for an original document, the height of the cover being automatically adjustable and kept in an essentially horizontal position as the height is adjusted.

2. Description of Related Art

A conventional flatbed-type scanner is shown in FIGS. 1a and 1b, wherein a cover 94 for an original document 98 has cylindrical posts 90 inserted into round holes 92 on the main body of the flatbed-type scanner, so that the cover 94 can be kept on the main body of the scanner. In addition, at least one groove 96 is provided on the cover 94 so that the cover 94 can be bent.

A drawback of this arrangement is that the cover 94 is inclined, as shown in FIG. 1b, when a thick original document (e.g. a book or a magazine) is to be scanned, because of the provision of the groove 96 and the cylindrical posts 90, and the user must push down the cover 94 and the original 98 with at least one hand so that the original 98 can be flatly pressed against the flatbed-type scanner in order to get a good scanning result.

Another drawback of the conventional cover arrangement is the phenomenon of uneven illumination at the edges of an image when the original document is relatively thick due to the incline of the cover.

SUMMARY OF THE INVENTION

An objective of the present invention is therefore to provide a flatbed-type scanner having a cover for an original document which overcomes the drawbacks of conventional cover arrangements by enabling the height of the cover to be automatically adjusted and kept in a generally horizontal position even when the original document is relatively thick.

Another objective of the present invention is to provide a flatbed-type scanner having a cover for an original document, the height of the cover being automatically adjustable so that the user does not need to push down on the cover in order to press a thick original document flatly against the scanner and which maintains the cover in a horizontal position even for a relatively thick document in order to mitigate the problem of uneven illumination at the edges of the resulting document image.

These objectives are achieved, in accordance with the principles of a preferred embodiment of the invention, by providing the cover with a pair of supporting arms for supporting horizontal axial bodies which are captured in recesses at edges of the main body of the scanner and permitted to move vertically in the recesses so as to permit vertical movement of the cover. The cross-sections of the axial bodies have a length which is greater than the width, and the recesses have openings defined by resilient members to have a width that is greater than the length of the cross-sections and less than the width of the cross-sections to enable the axial bodies to be inserted into the recesses upon rotation of the cover and to subsequently prevent unintentional removal of the axial bodies from the recesses as the cover is moved vertically while maintaining a substantially horizontal orientation.

DETAILED DESCRIPTION OF THE INVENTION

Figure 1A:
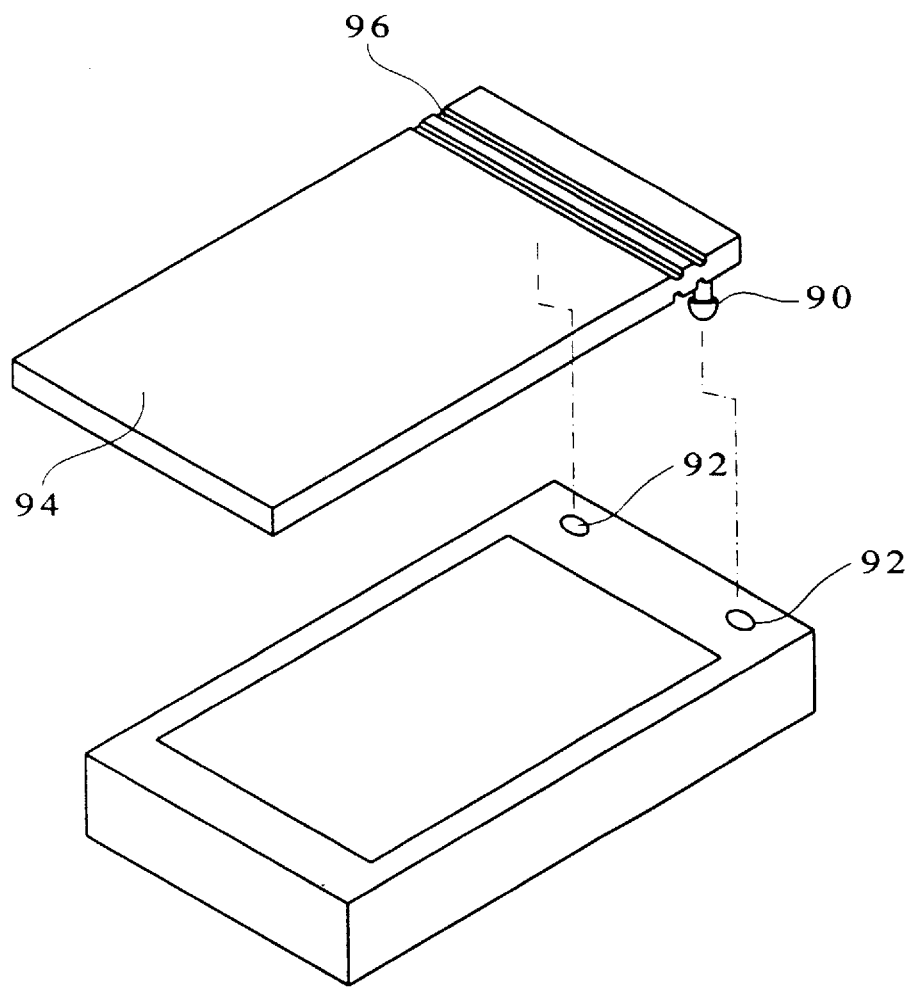
FIG. 1a is an exploded view showing one example of a conventional flatbed-type scanner.
Figure 1B:
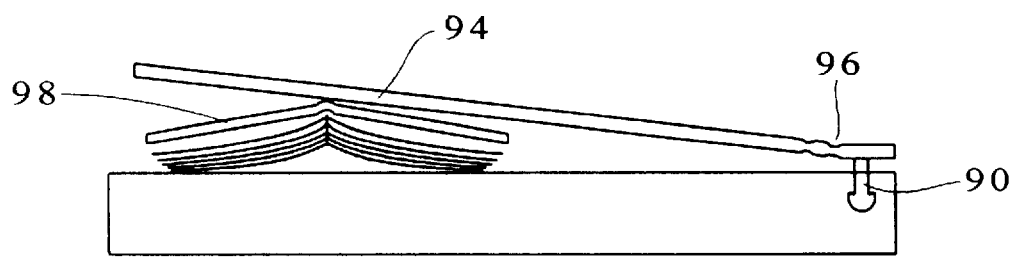
FIG. 1b is a schematic view showing the scanner of FIG. 1a with a thick original.
Figure 2:
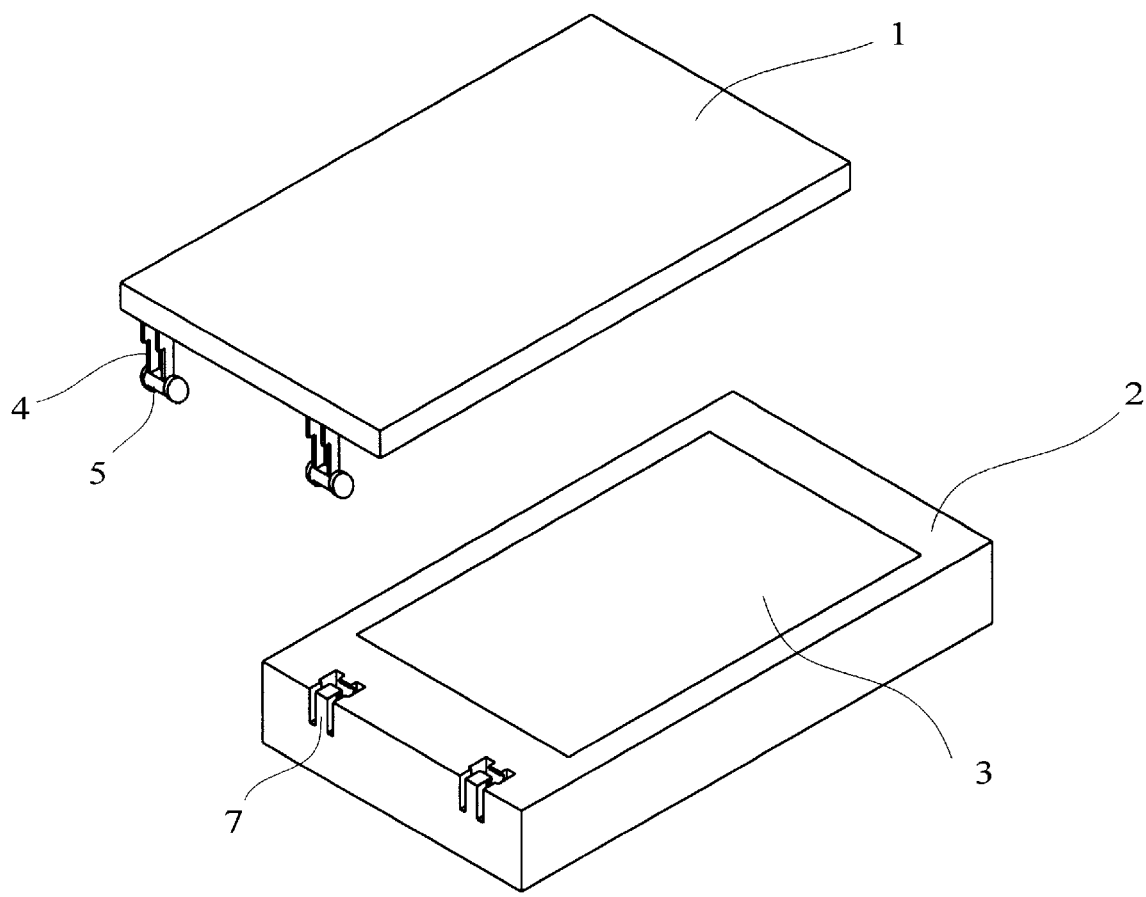
FIG. 2 is an exploded view showing a preferred embodiment of a flatbed-type scanner of the present invention.
Figure 3:
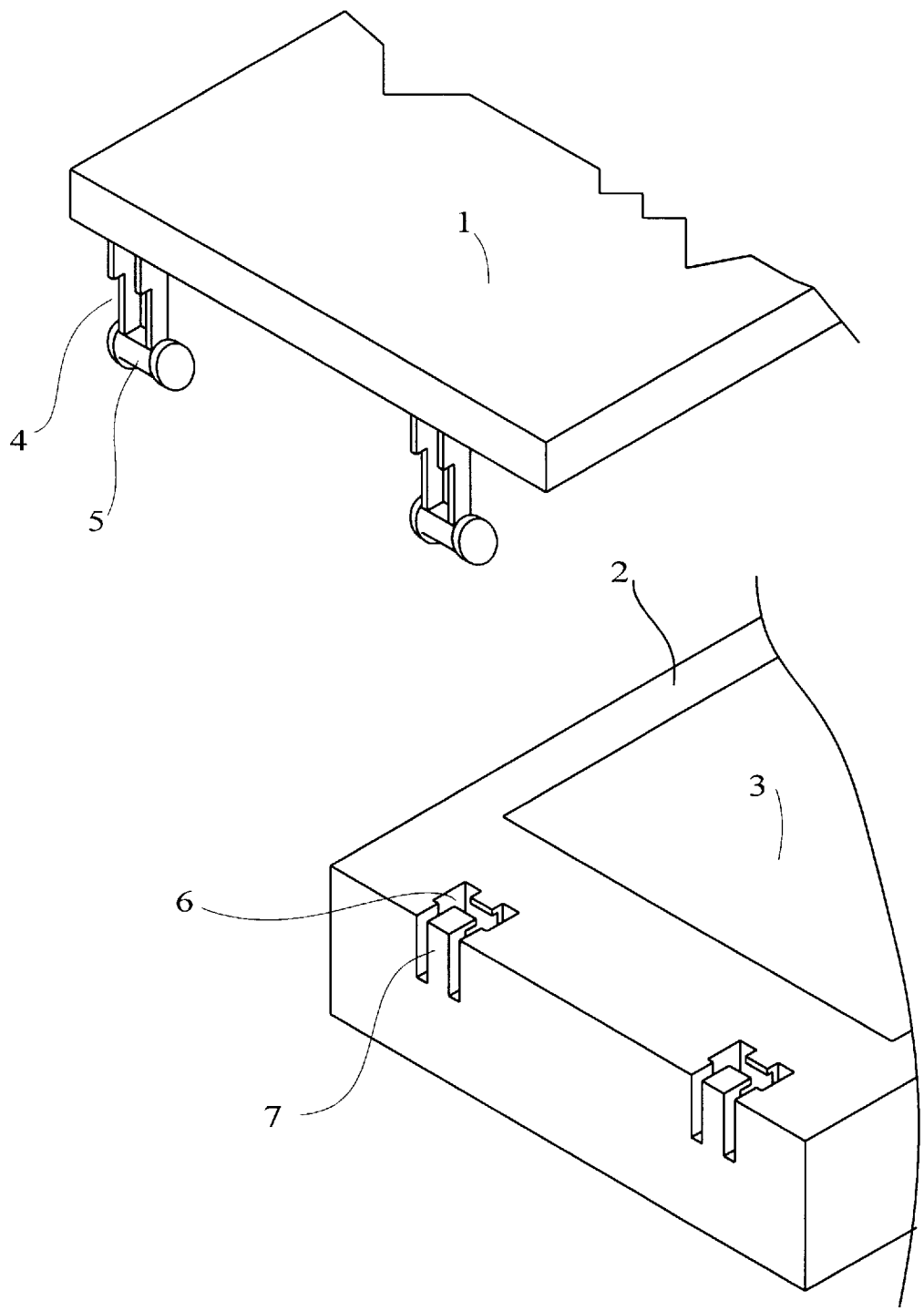
FIG. 3 is an enlarged exploded partial view showing a novel aspect of the embodiment shown in FIG. 2.

As illustrated in FIGS. 2–5, the cover 1 of a preferred embodiment of the present invention is provided with a pair of support arms 4, each of which is connected with a horizontal axial body 5. A main body 2 of a scanner is provided with a scanning area 3, a pair of recesses 6 and a corresponding pair of resilient axial body capturing members 7 situated adjacent the recesses 6. Reference numeral 8 refers to a document placed between the cover 1 and the scanning area 3.

The support arm 4 and the horizontal axial body 5 connected therewith are removably accommodated in the recess 6 provided on the main body 2 of the scanner. The length of a cross-section of the horizontal axial body 5 which is perpendicular to the axis is relatively greater than the width of the same axial cross-section, and the opening formed by a axial body capturing member 7 which is adjacent the recess 6 is arranged to have a width slightly smaller than the length of the cross-section of the horizontal axial body 5, but slightly larger than the width of the cross-section. As a result, the supporting arm 4 can move upwardly and downwardly in the recess 6 along with the upward and downward movement of the cover 1 while the resilient member 7 adjacent the recess 6 ensures that the cover 1 and the horizontal axial body 5 will not unintentionally separate from the main body 2 of the scanner.

Figure 4A:
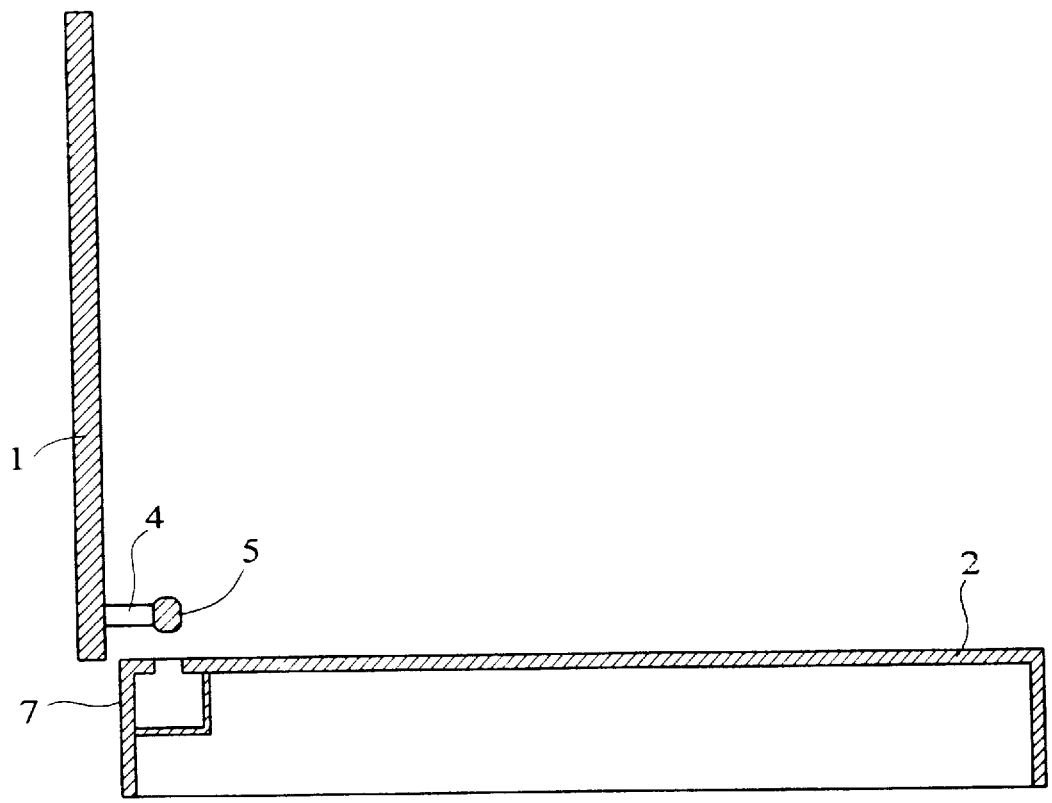
FIG. 4a is a schematic view showing a disassembled cover according to the preferred embodiment with a main body of the scanner.
Figure 4B:
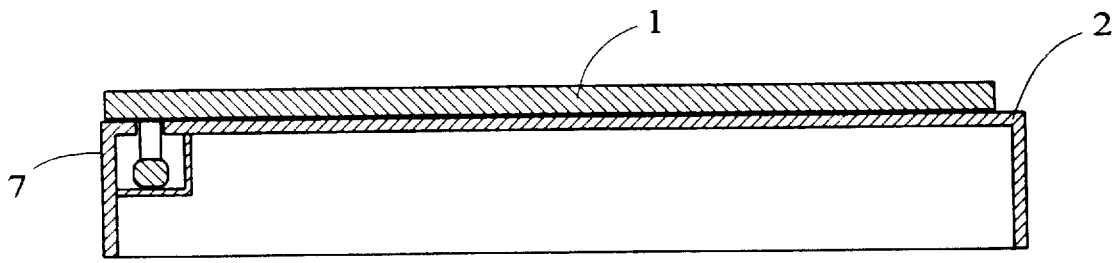
FIG. 4b is a schematic view showing the cover of the preferred embodiment assembled to a main body of a scanner.

The manner of assembling the cover 1 onto the main body 2 of the scanner is shown in FIGS. 4a and 4b. The cover 1 is held in a vertical position with the horizontal axial body 5 in alignment with an upper opening of the recess 6, and then the horizontal axial body 5 is inserted into the recess 6 while slowly rotating the cover 1 in a clockwise direction so that the horizontal axial body 5 and the supporting arm 4 can be received in the recess 6, and the cover 1 can be placed onto the scanning area 3. The assembling process can be smoothly completed because the length of the cross-section of the horizontal axial body 5 is relatively longer than the width of the cross-section, and because the width of the opening formed by the axial body capturing member 7 adjacent the recess 6 is slightly smaller than the length of the cross-section of the horizontal axial body 5. The horizontal axial body 5 can only be moved upwardly and downwardly in the recess 6 and will not incidentally separate from the main body 2 of the scanner, with a stepped portion preferably being formed on the supporting arm 4 to facilitate the opening of the cover 1 and to serve as a limit stopping means to prevent the cover 1 from being opened excessively.

Figure 5:
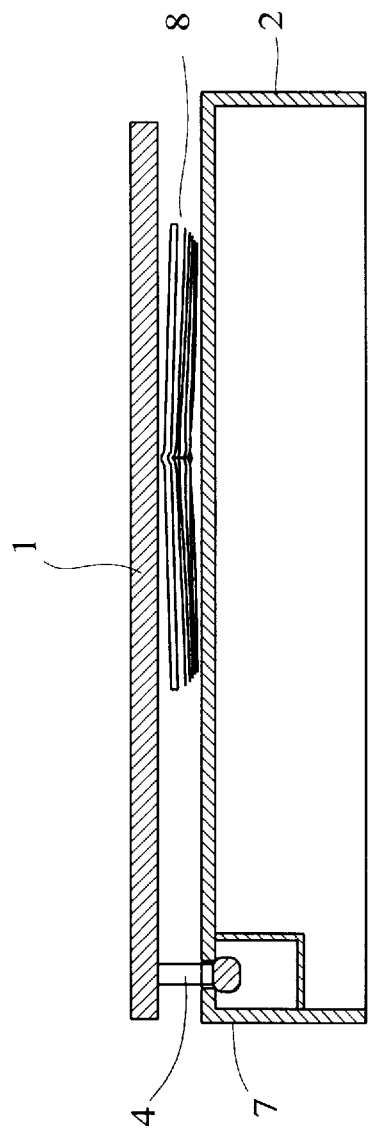
FIG. 5 is a schematic view showing the preferred scanner with a thick original placed between the cover and the scanning area.

During a scanning operation, as shown in FIG. 5, an original document 8 is put onto the scanning area 3, after which the cover 1 together with the horizontal axial body 5 and the supporting arm 4 are raised a distance which is about equal to the thickness of the original document in the state shown in FIG. 5, while being kept in a horizontal position, so that the weight of the cover 1, the horizontal axial body 5 and the supporting arm 4 pushes down the original document 8 to flatten it against the scanning area.

Having thus described a specific structure that can achieve the function of automatically adjusting the height of the cover 1 while maintaining the cover is a horizontal position and thereby overcome the problems associated with a conventional pivotal cover, however, it will be appreciated by those skilled in the art that variations and modifications may be made to the described structure without departing from the scope of the invention, and that the invention should therefore be limited solely by the appended claims.

What is claimed is:

1. A flatbed-type scanner having a cover for a document placed on a main body of the scanner, the height of the cover being automatically adjustable to accommodate different thickness documents, wherein the cover has at least one supporting arm which is connected to a horizontal axial body; at least one recess is formed in an edge of the main body of the scanner for accommodating the supporting arm and the horizontal axial body connected therewith to permit vertical movement within the recess and therefore vertical movement of the cover, and at least one resilient member is provided adjacent the recess for preventing unintentional removal of the horizontal axial body from the recess.

2. A flatbed-type scanner as claimed in claim 1, wherein a length of a cross-section of the horizontal axial body taken perpendicular to the axis of the body is longer than a width of the cross-section; an opening is formed by the resilient support arm at the recess; and the width of this opening is slightly smaller than the length of cross-section but slightly larger than the width of the cross-section to permit the axial body to be easily inserted into the recess by rotating the cover so that the axial body passes through the opening, the larger length of the cross-section preventing the axial body from passing back through the opening when the cover is in a horizontal state.

3. A scanner as claimed in claim 1, wherein the supporting arm is provided with a stepped portion for serving as a limit stopping means to prevent the cover from being opened excessively.

\* \* \* \* \*